US012598064B2

(12) United States Patent
Ashkinazi

(10) Patent No.: US 12,598,064 B2
(45) Date of Patent: Apr. 7, 2026

(54) ESTABLISHING TRUST BY A COMMUNITY OF VEHICLES

(71) Applicant: Red Bend Ltd., Hod Ha'Sharon (IL)

(72) Inventor: Alexander Ashkinazi, Rishon LeZion (IL)

(73) Assignee: RED BEND LTD., Hod Hasharon (IL)

( * ) Notice: Subject to any disclaimer, the term of this patent is extended or adjusted under 35 U.S.C. 154(b) by 438 days.

(21) Appl. No.: 18/260,702

(22) PCT Filed: Jan. 7, 2021

(86) PCT No.: PCT/IL2021/050025
§ 371 (c)(1),
(2) Date: Jul. 7, 2023

(87) PCT Pub. No.: WO2022/149121
PCT Pub. Date: Jul. 14, 2022

(65) Prior Publication Data
US 2024/0056297 A1 Feb. 15, 2024

(51) Int. Cl.
*H04L 9/08* (2006.01)
*H04L 9/30* (2006.01)

(52) U.S. Cl.
CPC ............... *H04L 9/088* (2013.01); *H04L 9/30* (2013.01)

(58) Field of Classification Search
CPC .......... H04W 4/40; H04W 4/44; H04W 4/46; H04W 12/069; H04W 12/06; H04L 63/08;
(Continued)

(56) References Cited

U.S. PATENT DOCUMENTS

| | | |
|---|---|---|
| 10,783,600 B2 | 9/2020 | Zachary |
| 12,020,013 B2 * | 6/2024 | Michelsohn ............ G06F 21/57 |

(Continued)

FOREIGN PATENT DOCUMENTS

| | | |
|---|---|---|
| WO | 2020170233 A1 | 8/2020 |
| WO | 2022149121 A1 | 7/2022 |

OTHER PUBLICATIONS

ISA Israel Patent Office, International Search Report and Written Opinion Issued in Application No. PCT/IL2021/050025, Apr. 22, 2021, WIPO, 10 pages.
(Continued)

*Primary Examiner* — Tae K Kim
(74) *Attorney, Agent, or Firm* — McCoy Russell LLP

(57) ABSTRACT

Disclosed herein are system and methods for authenticating vehicles based on trust established within a community of vehicles using a distributed ledger associating an identifier of each vehicle with a respective public key uniquely assigned to the respective vehicle. When a vehicle requests to establish a communication session with another party, which may be another vehicle or a service system, the vehicle may transmit its identifier and a message signed using its respective private key from which its public key is derived. In response, to authenticate the vehicle, the other party may communicate with one or more trusted vehicles which may verify the vehicle is genuinely associated with the public key by decoding the message using the public key retrieved from their local copy of the distributed ledger. The other party may then establish the communication session or refuse it based on the whether the verification is successful or not.

18 Claims, 5 Drawing Sheets

(58) Field of Classification Search
CPC ............. H04L 63/0876; H04L 63/0884; H04L
63/0892; H04L 67/12; H04L 67/104;
H04L 2209/84
See application file for complete search history.

(56) References Cited

U.S. PATENT DOCUMENTS

| | | | | |
|---|---|---|---|---|
| 12,278,915 | B2 * | 4/2025 | Tian | H04L 63/06 |
| 2018/0285088 | A1 * | 10/2018 | Lancioni | H04W 4/50 |
| 2019/0053051 | A1 * | 2/2019 | Yu | H04L 61/00 |
| 2020/0120458 | A1 * | 4/2020 | Aldana | H04W 28/22 |
| 2020/0145191 | A1 * | 5/2020 | Qi | H04L 9/3239 |
| 2020/0228950 | A1 * | 7/2020 | Clark | H04L 67/06 |
| 2020/0244671 | A1 | 7/2020 | Nagata et al. | |
| 2020/0313907 | A1 | 10/2020 | Mondello et al. | |
| 2021/0112410 | A1 * | 4/2021 | Mitra | H04L 9/3026 |
| 2021/0218710 | A1 * | 7/2021 | Fallah | H04L 9/14 |
| 2021/0336797 | A1 * | 10/2021 | Van Duren | H04L 9/0643 |
| 2022/0147337 | A1 * | 5/2022 | Michelsohn | H04L 67/34 |

OTHER PUBLICATIONS

European Patent Office, Extended European Search Report Issued in
Application No. 21916664.2, Jun. 4, 2024, Germany, 8 pages.
International Bureau of WIPO, International Preliminary Report on
Patentability Issued in Application No. PCT/IL2021/050025, Apr.
30, 2023, WIPO, 14 pages.

* cited by examiner

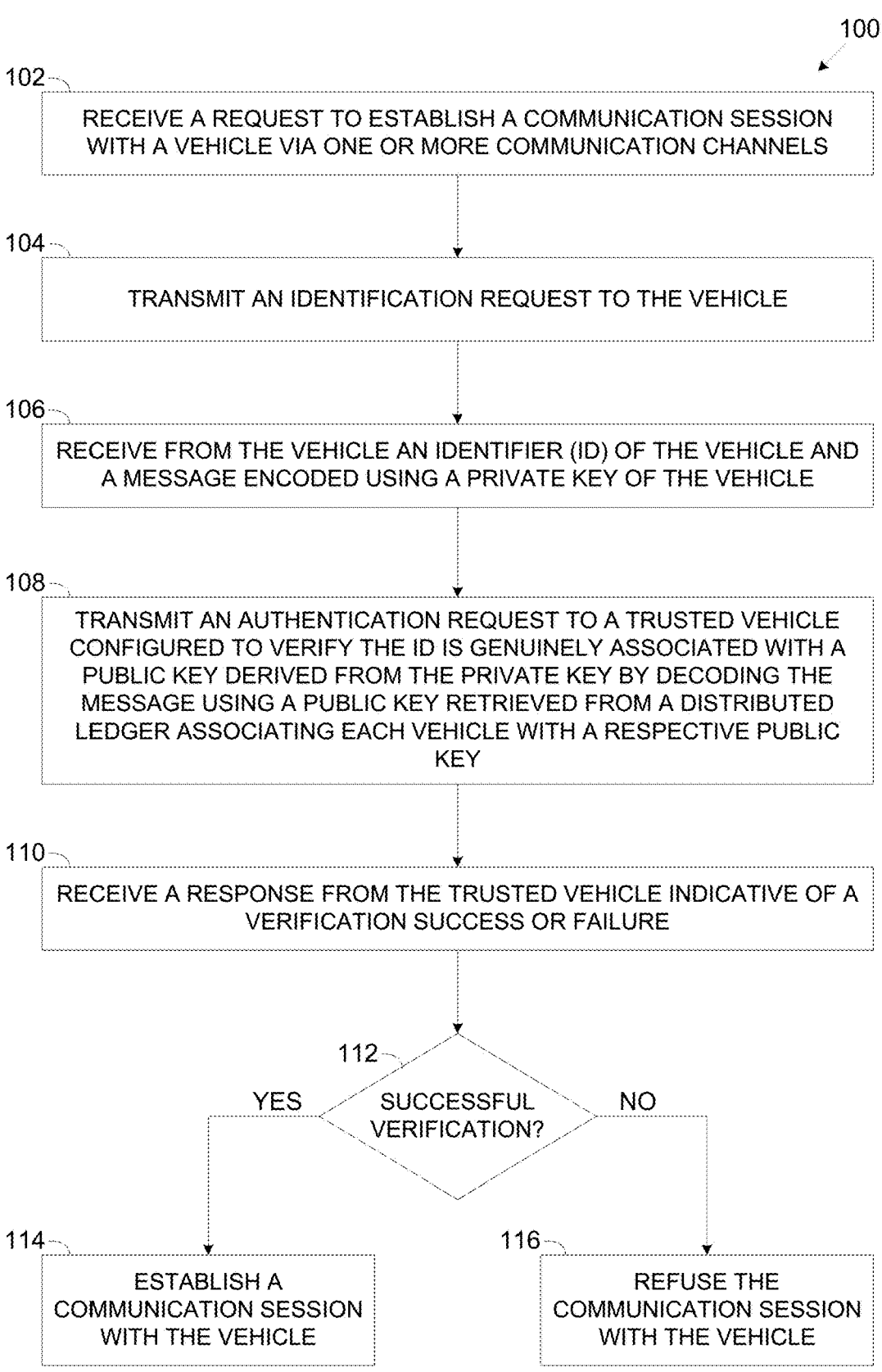

100

102 — RECEIVE A REQUEST TO ESTABLISH A COMMUNICATION SESSION WITH A VEHICLE VIA ONE OR MORE COMMUNICATION CHANNELS

104 — TRANSMIT AN IDENTIFICATION REQUEST TO THE VEHICLE

106 — RECEIVE FROM THE VEHICLE AN IDENTIFIER (ID) OF THE VEHICLE AND A MESSAGE ENCODED USING A PRIVATE KEY OF THE VEHICLE

108 — TRANSMIT AN AUTHENTICATION REQUEST TO A TRUSTED VEHICLE CONFIGURED TO VERIFY THE ID IS GENUINELY ASSOCIATED WITH A PUBLIC KEY DERIVED FROM THE PRIVATE KEY BY DECODING THE MESSAGE USING A PUBLIC KEY RETRIEVED FROM A DISTRIBUTED LEDGER ASSOCIATING EACH VEHICLE WITH A RESPECTIVE PUBLIC KEY

110 — RECEIVE A RESPONSE FROM THE TRUSTED VEHICLE INDICATIVE OF A VERIFICATION SUCCESS OR FAILURE

112 — SUCCESSFUL VERIFICATION?

YES

NO

114 — ESTABLISH A COMMUNICATION SESSION WITH THE VEHICLE

116 — REFUSE THE COMMUNICATION SESSION WITH THE VEHICLE

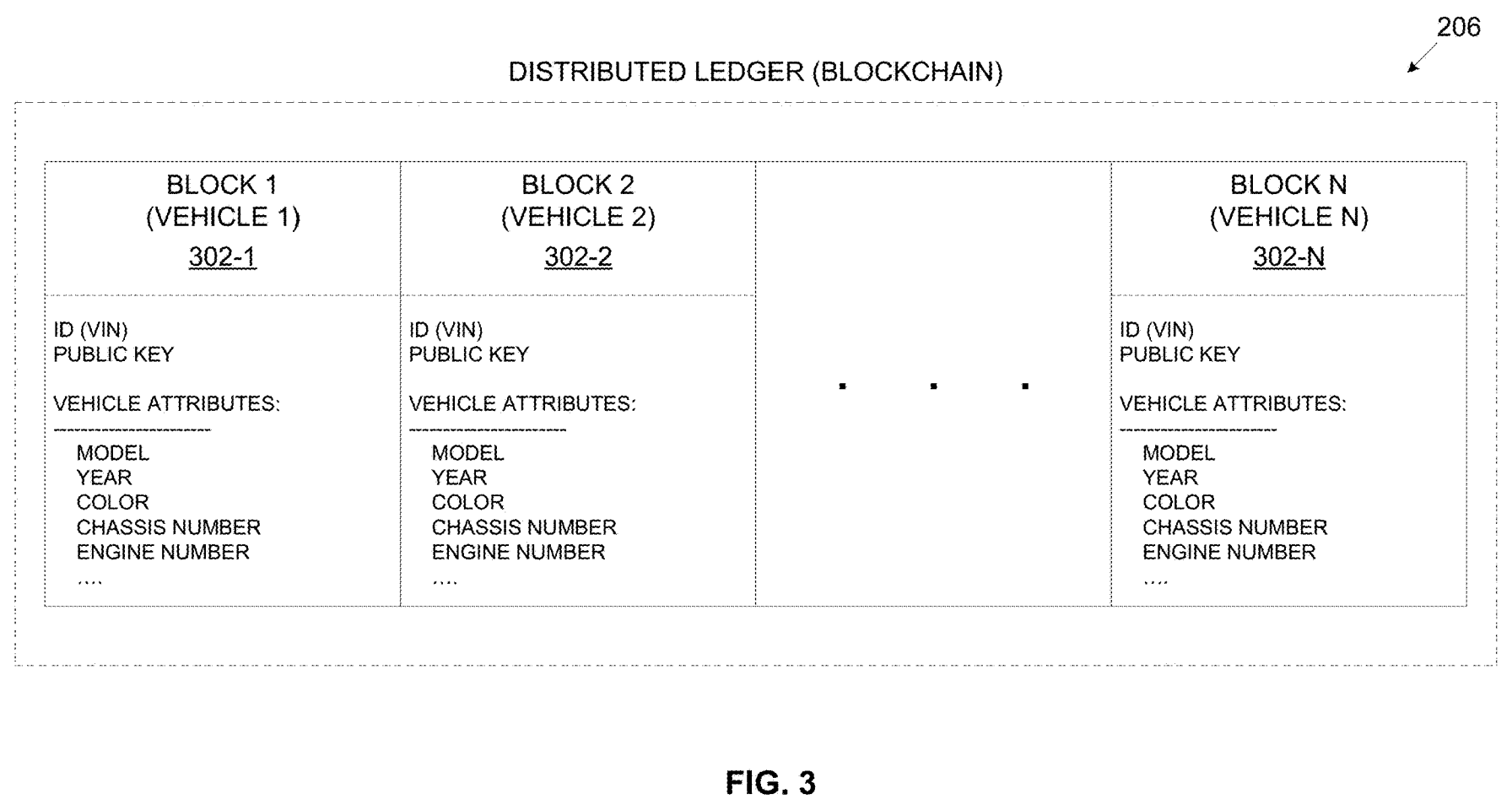

DISTRIBUTED LEDGER (BLOCKCHAIN)

BLOCK 1
(VEHICLE 1)
302-1

ID (VIN)
PUBLIC KEY

VEHICLE ATTRIBUTES:

MODEL
YEAR
COLOR
CHASSIS NUMBER
ENGINE NUMBER
. . . .

BLOCK 2
(VEHICLE 2)
302-2

ID (VIN)
PUBLIC KEY

VEHICLE ATTRIBUTES:

MODEL
YEAR
COLOR
CHASSIS NUMBER
ENGINE NUMBER
. . . .

BLOCK N
(VEHICLE N)
302-N

ID (VIN)
PUBLIC KEY

VEHICLE ATTRIBUTES:

MODEL
YEAR
COLOR
CHASSIS NUMBER
ENGINE NUMBER
. . . .

FIG. 3

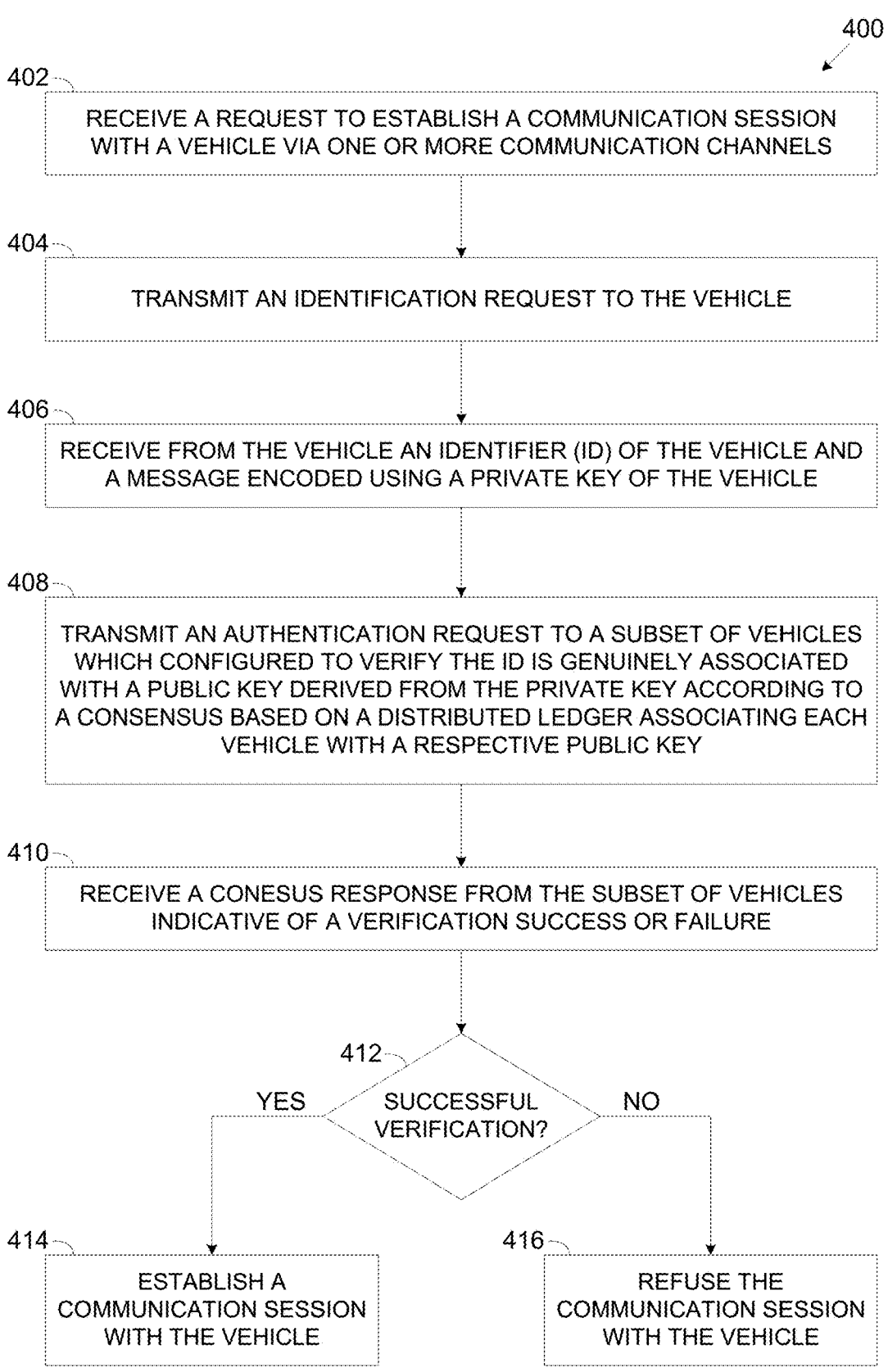

400

402
RECEIVE A REQUEST TO ESTABLISH A COMMUNICATION SESSION WITH A VEHICLE VIA ONE OR MORE COMMUNICATION CHANNELS

404
TRANSMIT AN IDENTIFICATION REQUEST TO THE VEHICLE

406
RECEIVE FROM THE VEHICLE AN IDENTIFIER (ID) OF THE VEHICLE AND A MESSAGE ENCODED USING A PRIVATE KEY OF THE VEHICLE

408
TRANSMIT AN AUTHENTICATION REQUEST TO A SUBSET OF VEHICLES WHICH CONFIGURED TO VERIFY THE ID IS GENUINELY ASSOCIATED WITH A PUBLIC KEY DERIVED FROM THE PRIVATE KEY ACCORDING TO A CONSENSUS BASED ON A DISTRIBUTED LEDGER ASSOCIATING EACH VEHICLE WITH A RESPECTIVE PUBLIC KEY

410
RECEIVE A CONESUS RESPONSE FROM THE SUBSET OF VEHICLES INDICATIVE OF A VERIFICATION SUCCESS OR FAILURE

412
YES          SUCCESSFUL VERIFICATION?          NO

414
ESTABLISH A COMMUNICATION SESSION WITH THE VEHICLE

416
REFUSE THE COMMUNICATION SESSION WITH THE VEHICLE

FIG. 4

ESTABLISHING TRUST BY A COMMUNITY OF VEHICLES

CROSS-REFERENCE TO RELATED APPLICATIONS

The present application is a U.S. National Phase of International Application No. PCT/IL2021/050025, entitled "ESTABLISHING TRUST BY A COMMUNITY OF VEHICLES", and filed on Jan. 7, 2021. The entire contents of the above-listed application are hereby incorporated by reference for all purposes.

BACKGROUND

Some embodiments described herein relate to authenticating vehicles, and, more specifically, but not exclusively, to authenticating vehicles based on trust established within a community of vehicles using a distributed ledger maintained by the community.

The automotive industry as well as the transportation infrastructures and the automotive services are constant and rapidly advancing in recent times.

One of the most prominent evolution paths is connectivity. Such connectivity may be desired, for example, for establishing communication channels between vehicles, between vehicles and transportation infrastructures (e.g. smart traffic lights, smart crossroads, smart city, etc.) and/or between vehicles and service providers, specifically, systems, platforms, services and/or infrastructures configured to provide services to the vehicles, for example, cellular network access, multimedia services, software update services, fueling, electric charging services and/or the like.

However, such connectivity may open the gate for potential malicious parties which may attempt to exploit and/or attack these connected vehicles, systems, platforms, services and/or infrastructures in order to compromise them for one or more purposes which is some cases may be highly dangerous and potentially lethal.

Major security measures may be therefore deployed to protect these assets from such malicious exploitation and/or attacks.

SUMMARY

According to a first aspect described herein there is provided a method of authenticating vehicles based on trust established within a community of vehicles using a distributed ledger, comprising using one or more processors for:

Receiving, via one or more communication channels, a request to establish a communication session with one or more of a plurality of vehicles. The request comprising an identifier of the respective vehicle and a message signed using a private key of the respective vehicle. The message is decodable using a public key derived from the private key.

Transmitting an authentication request comprising the identifier and the message to a trusted vehicle configured to verify the identifier is genuinely associated with the public key by decoding the message using the public key retrieved from a local ledger stored at the trusted vehicle which is a copy of a distributed ledger associating an identifier of each of the plurality of vehicles with a respective unique public key. The distributed ledger maintained by the plurality of vehicles employing one or more consensus algorithms.

Receiving a response from the trusted vehicle indicative of a verification success or failure.

Establishing the communication session with the one or more vehicles in case of successful verification.

According to a second aspect described herein there is provided a system for authenticating vehicles based on trust established within a community of vehicles using a distributed ledger, comprising one or more communication interfaces configured to communicate with one or more of a plurality of vehicles via one or more communication channel, and one or more processors coupled to the one or more communication interfaces. The one or more processors execute a code, the code comprising:

Code instructions to receive, via one or more of the communication channel, a request to establish a communication session with one or more of a plurality of vehicles. The request comprising an identifier of the respective vehicle and a message signed using a private key of the respective vehicle. The message is decodable using a public key derived from the private key.

Code instructions to transmit an authentication request comprising the identifier and the message to a trusted vehicle configured to verify the identifier is genuinely associated with the public key by decoding the message using the public key retrieved from a local ledger stored at the trusted vehicle which is a copy of a distributed ledger associating an identifier of each of the plurality of vehicles with a respective unique public key. The distributed ledger maintained by the plurality of vehicles employing one or more consensus algorithms.

Code instructions to receive a response from the trusted vehicle indicative of a verification success or failure.

Code instructions to establish the communication session with the one or more vehicles in case of successful verification.

According to a third aspect described herein there is provided a computer program product comprising program instructions executable by a computer, which, when executed by the computer, cause the computer to perform a method according to the first aspect.

In a further implementation form of the first, second and/or third aspects, the message is signed as one or more hash values computed using one or more hash function based on the private key of the one or more vehicles.

In an optional implementation form of the first, second and/or third aspects, verifying the identifier is genuinely associated with the public key by decoding the message is done using the public key retrieved from a locally stored ledger which is a copy of the distributed ledger.

In an optional implementation form of the first, second and/or third aspects, verifying the identifier is genuinely associated with the public key is done based on a consensus among a subset of the plurality of vehicles each using its locally stored ledger to decode the message using the public key.

In a further implementation form of the first, second and/or third aspects, the one or more communication channels are members of a group consisting of: a wireless communication channel and a wired communication channel.

In a further implementation form of the first, second and/or third aspects, the one or more communication channels are Vehicle to Everything (V2X) communication channels comprising one or more members of a group consisting of: a Vehicle to Infrastructure (V2I), communication channel, a Vehicle to Network (V2N) communication channel, a Vehicle to Vehicle (V2V) communication channel, a Vehicle to Device (V2D) communication channel and a Vehicle to Grid (V2G) communication channel.

In a further implementation form of the first, second and/or third aspects, the one or more processors is installed in another one of the plurality of vehicles.

In a further implementation form of the first, second and/or third aspects, the one or more processors is installed in a service system configured to provide one or more services to one or more of the plurality of vehicles.

In a further implementation form of the first, second and/or third aspects, the identifier of each of the plurality of vehicles comprises at least a Vehicle Identification Number (VIN) of the respective vehicle.

In an optional implementation form of the first, second and/or third aspects, the message further comprises one or more of a plurality of properties of the one or more vehicles. The plurality of properties comprising: a manufacturer, a year of manufacture, a color, a chassis serial number and an engine serial number.

In a further implementation form of the first, second and/or third aspects, the distributed ledger associates each of one or more of the plurality of vehicles with one or more of the plurality of properties applicable for the respective vehicle.

In a further implementation form of the first, second and/or third aspects, the private key and the public key assigned to each of the plurality of vehicles constitute a respective cryptographic key pair uniquely allocated to the respective vehicle, the respective public key of each vehicle is publicly distributed and the respective private key is privately stored by the respective vehicle thus known only to the respective vehicle.

In a further implementation form of the first, second and/or third aspects, the distributed ledger maintained by the plurality of vehicles is implemented by a blockchain comprising a plurality of immutable irreversible blocks, each of the plurality of immutable irreversible blocks is created by a single authorized management system to associate a respective one of the plurality of vehicle with a respective unique public key.

In a further implementation form of the first, second and/or third aspects, each of the plurality of vehicles communicates with at least a subset of the plurality of vehicles to continuously update and synchronize its respective locally stored ledger.

In a further implementation form of the first, second and/or third aspects, the number of vehicles of the subset is set according to one or more parameters of one or more of the consensus algorithms employed by the plurality of vehicles for updating and synchronizing their respective locally stored ledgers.

In a further implementation form of the first, second and/or third aspects, of the plurality of vehicles communicates with a respective subset of vehicles located within a reception range of one or more of the communication channels of the respective vehicle.

In an optional implementation form of the first, second and/or third aspects, the respective vehicle communicates with each of at least some of the vehicles of the respective subset in a plurality of separate communication sessions while the respective vehicle of the respective subset is located within the reception range.

In an optional implementation form of the first, second and/or third aspects, one or more of the plurality of vehicles updates and synchronizes its locally stored ledger cumulatively in a plurality of separate communication sessions, during each of the plurality of communication sessions a portion of update data is received for updating the locally stored ledger.

Unless otherwise defined, all technical and/or scientific terms used herein have the same meaning as commonly understood by one of ordinary skill in the art to which some embodiments described herein pertain. Although methods and materials similar or equivalent to those described herein can be used in the practice or testing of embodiments described herein, exemplary methods and/or materials are described below. In case of conflict, the patent specification, including definitions, will control. In addition, the materials, methods, and examples are illustrative only and are not intended to be necessarily limiting.

Implementation of the method and/or system of some embodiments described herein can involve performing or completing selected tasks manually, automatically, or a combination thereof. Moreover, according to actual instrumentation and equipment of the method and/or system of embodiments described herein, several selected tasks could be implemented by hardware, by software or by firmware or by a combination thereof using an operating system.

For example, hardware for performing selected tasks according to some embodiments described herein could be implemented as a chip or a circuit. As software, selected tasks according to some embodiments described herein could be implemented as a plurality of software instructions being executed by a computer using any suitable operating system. In exemplary embodiments described herein, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments are described herein by way of example only, with reference to the accompanying drawings. With specific reference now to the drawings in detail, it is stressed that the particulars shown are by way of example and for purposes of illustrative discussion of embodiments described herein. In this regard, the description taken with the drawings makes apparent to those skilled in the art how embodiments described herein may be practiced.

In the drawings:

FIG. 1 is a flowchart of an exemplary process of authenticating a vehicle based on trust established in a community of networked vehicles according to a consensus among the vehicles, according to some embodiments described herein;

FIG. 3 is a schematic illustration of an exemplary blockchain distributed ledger maintained by a community of networked vehicles for authenticating a vehicle according to a consensus among the vehicles, according to some embodiments described herein; and FIG. 4 is a flowchart of an exemplary alternative process of authenticating a vehicle based on trust established in a community of networked vehicles according to a consensus among the vehicles, according to some embodiments described herein.

DETAILED DESCRIPTION

Figure 2A:
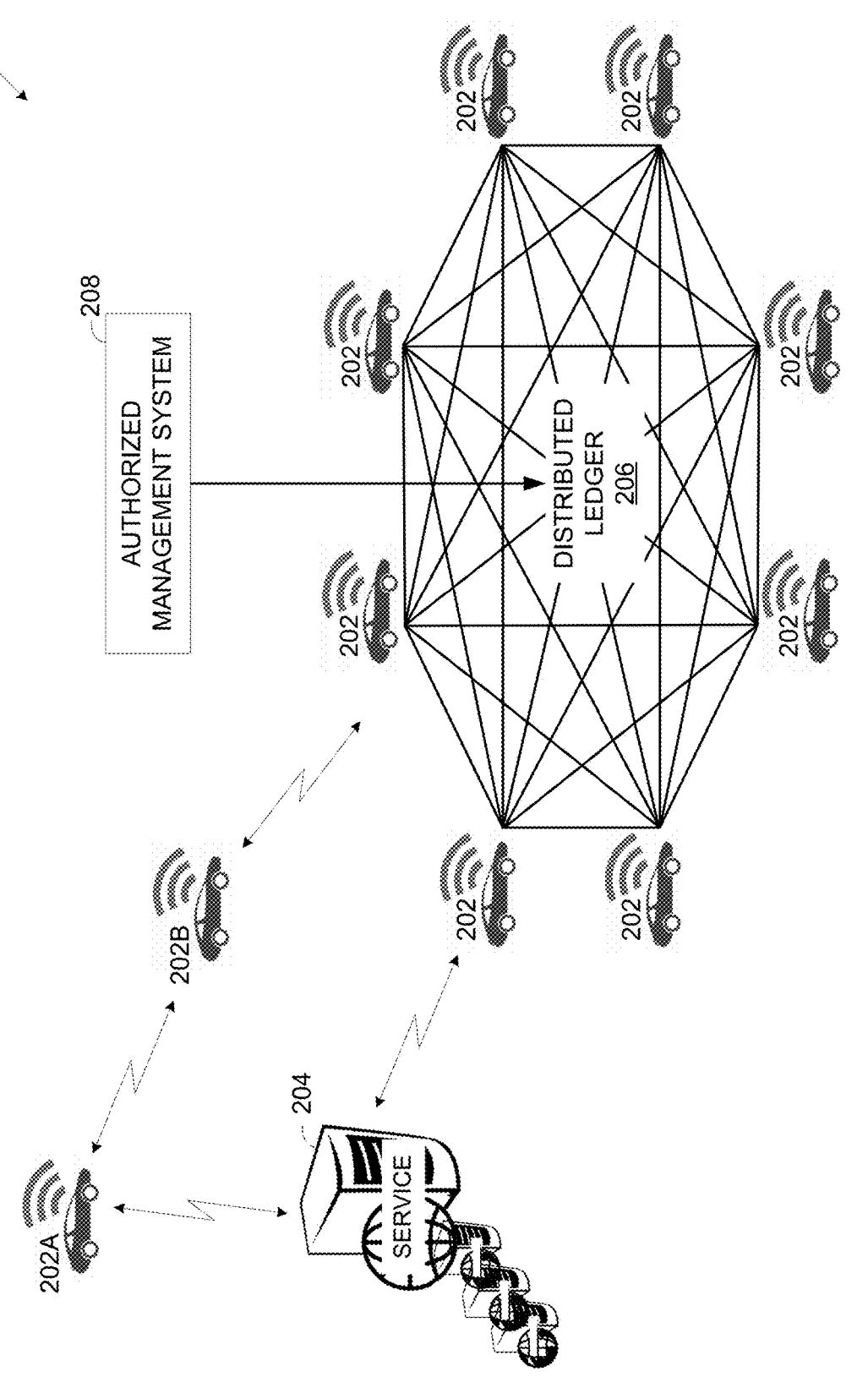
FIG. 2A and FIG. 2B are schematic illustrations of an exemplary vehicle community environment for authenticating a vehicle based on trust established in a community of networked vehicles according to a consensus among the vehicles, according to some embodiments described herein.

Some embodiments described herein relate to authenticating vehicles, and, more specifically, but not exclusively, to authenticating vehicles based on trust established within a community of vehicles using a distributed ledger maintained by the community.

According to some embodiments described herein, there are provided methods, systems and computer program products for authenticating one or more vehicles requesting to establish a communication session with one or more other vehicles and/or with one or more systems, platforms, services and/or infrastructures (collectively designated service systems herein after).

The authentication of the vehicle(s) is based on trust established within a community of vehicles comprising a plurality of vehicles, specifically based on a distributed ledger, for example, a blockchain and/or the like maintained by the plurality of vehicles according to a consensus among the vehicles. The plurality of vehicles of the community may engage in one or more consensus session using one or more consensus algorithms and/or protocols as known in the art to maintain, i.e., update and synchronize a copy of the distributed ledger locally stored by each of the vehicles.

Each of the vehicles of the community may be assigned a unique cryptographic key pair, specifically an asymmetric cryptographic key pair comprising a respective private key and a respective public key where the public key is derived from the respective private key. As known in the art, a message signed (encrypted) using a certain private key may be decoded (decrypted) using the respective public key derived from the certain private key. Therefore, a message originating from a certain vehicle and signed using the private key assigned to the certain vehicle may be decoded using the public key associated with the certain vehicle thus ensuring that the certain vehicle is the origin of the message. The public key of each of the vehicles is publicly distributed while the private key of each vehicle is locally stored by the respective vehicle in a private and secure manner such that the public key known only to the respective vehicle.

The distributed ledger may therefore associate each of the vehicles of the community with a respective public key. In particular, the distributed ledger may associate a unique identifier (ID), for example, a Vehicle Identification Number (VIN) of each of the vehicles of the community with a respective public key of the respective vehicle. Optionally, the distributed ledger may further include one or more vehicle properties of one or more of the vehicles, for example, a model, a manufacturer, a year of manufacture, a color, a chassis serial number, an engine serial number and/or the like.

The distributed ledger, for example, the blockchain may be constructed of a plurality of immutable irreversible blocks as known in the art which are created to record the association between the identifiers of the vehicles of the community and their respective public keys and optionally their vehicle property(s). The blocks may be initiated by a single authorized management system, for example, a manufacturer (OEM) of the vehicles, an integrator of the vehicles, a joint consortium established by multiple car makers and/or the like.

The plurality of vehicles of the community may communicate with each other via one or more communications channels which may typically be wireless due to the dynamic and mobile nature of the vehicles but may optionally include one or more wired communications channels which may be used when the vehicles are stationary, for example, parked, serviced and/or the like. Via the communications channels, the plurality of vehicles may communicate with each other and may engage in the consensus session(s) according to the consensus algorithm(s) and/or protocol(s) to maintain their local copies of the distributed ledger.

When a (first) vehicle requests to establish a communication session with another party, for example, another (second) vehicle, a service system and/or the like, the requested (other) party may first authenticate the requesting (first) vehicle to ensure the first vehicle is genuinely the vehicle it claims to be before establishing the communication session with the first vehicle.

The other party may obtain the identifier (ID) of the first vehicle and a message signed by the first vehicle using its uniquely associated private key. The message may optionally include one or more of the vehicle properties of the first vehicle. The other party may request the identifier (ID) and message from the first vehicle or the first vehicle may provide them as part of the communication session request initially issued to the other party.

The other party may then transmit the identifier of the first vehicle coupled with the signed message to a trusted vehicle of the community of vehicles which maintains a locally stored copy of the distributed ledger. The trusted vehicle may authenticate the first vehicle based on verification that the message is signed by the first vehicle using its uniquely assigned private key. Specifically, the trusted vehicle may traverse its locally stored copy of the distributed ledger to identify and retrieve the public key associated in the distributed ledger with the identifier received from the first vehicle. The trusted vehicle may then decode the message using the retrieved public key.

In case of successful decoding, the trusted vehicle may verify that the public key is indeed derived from the private key used to sign the message and the first vehicle is successfully authenticated. However, in case of failure to decode the message, the trusted vehicle may determine that the public key associated in the distributed ledger with the first vehicle is not derived from the private key used to sign the message. Accordingly, the trusted vehicle may determine that the first vehicle is not authenticated and may be a potential malicious party attempting to impersonate as the first vehicle.

Then trusted vehicle may then respond to the other party with an indication of success or failure to verify the identifier received from the first vehicle is genuinely associated in the distributed ledger with the first vehicle. The response may therefore indicate of whether the first vehicle is successfully authenticated or not.

Based on the response, i.e., authentication success or failure, the other party may accept the request to establish the communication session with the first vehicle or refuse the communication session.

Optionally, assuming the other party maintains a local copy of the distributed ledger, instead of communicating with the trusted vehicle, the other party may access its locally stored ledger to retrieve the public key associated with the identifier received from the first vehicle. The other party may then use the retrieved public key to decode the message received from the first vehicle. As described herein before, in case of successful decoding, the other party may verify the retrieved public key is indeed associated with the first vehicle and may establish the communication session with the first vehicle. In contrast, in case of decoding failure, the other party may determine that the retrieved public key is not associated with the first vehicle and may refuse the communication session with the first vehicle.

According to some embodiments, the other party may verify that the identifier provided by the first vehicle is genuinely associated in the distributed ledger with the public key of the first vehicle based on a consensus among at least a subset of the plurality of vehicles of the community. In particular, the subset may include vehicles which are in close proximity to the other party, specifically in the transmission and reception range of the other party and of each other. In this operation mode, the other party may transmit the identifier of the first vehicle and the message signed by the first vehicle to an in-range subset of vehicles which may engage in a consensus session one or more of the consensus algorithms and/or protocols to reach a consensus of whether the identifier provided by the first vehicle is genuinely associated with the public key associated with the first vehicle in the distributed ledger. In particular, each of the vehicles of the subset may use its respective locally stored copy of the distributed ledger to individually verify the genuine association and may engage in the consensus session to reach a collective verification among the subset of vehicles.

Optionally, the number of vehicles of the subset that is sufficient for a reliable and certain verification of the association between the identifier of the first vehicle and the respective public key may be defined according to one or more security parameters defined for the communication session requested by the first vehicle with the other party. For example, in case the first vehicle requests to establish the communication session for the purpose of exchanging low sensitivity data, the number of vehicles of the subset approached by the other party may include a relatively low number of vehicles. On the other hand, in case the first vehicle requests to establish the communication session for the purpose of exchanging high security and/or high sensitivity data, the number of vehicles of the subset approached by the other party may include a significantly high number of vehicles.

Authenticating the vehicles based on the distributed ledger maintained by the community of vehicles may present significant advantages compared to currently existing methods and systems for authenticating vehicles.

Most if not all of the existing vehicle authentication systems are based on one or more central authentication entities deployed to provide authentication services to the plurality of vehicles and/or service systems. The authentication entity may generate an authentication certificate for each of the vehicles which is signed using the private key of the authentication entity. Whenever a vehicle is requested to authenticate itself to another vehicle or a service system, the vehicle may provide (present) its authentication certificate signed by the authentication entity. Each of the vehicles and/or service systems having the public key derived from the private key of the authentication entity may verify that the signed authentication certificate is genuine certificate create by the authentication entity. The centralized architecture of the authentication entity may however, present major limitations which are efficiently resolved by the distributed ledger based vehicles authentication.

First, the centralized authentication entities are independent from the vehicle manufacturers, integrators and/or dealers and is therefore not controllable by the vehicle manufacturing and distribution industry. The distributed ledger based authentication on the other hand is completely controlled by the vehicle manufacturers which are the only entity authorized to add new vehicle information to the distributed ledger.

Moreover, the centralized authentication entities may be significantly costly due to extensive resources, development, deployment, maintenance required for providing the authentication service. Moreover, the independent central authentication entity may be a separate profit unit which may further increase its cost. The costs of the central authentication service may be therefore applied on the vehicles manufacturers, integrators and/or dealers and ultimately on the end buyers of the vehicles which may be subject to additional costs for the authentication service. This is in contrast to the distributed ledger which is not maintained by a central independent but rather by the plurality of vehicles. Moreover, each of vehicle may be required to invest very limited and relatively little additional computing resources for maintaining its locally stored copy of the distributed ledger synchronized and up to date. The costs for implementing the distributed ledger based vehicles authentication may be therefore insignificant.

Furthermore, the centralized authentication entities may be susceptible and exposed to potential malicious attacks initiated by malicious parties to compromise the centralized authentication entities in order to obtain, create, delete, alter and/or manipulate the authentication certificates (e.g. fake certificates). The distributed ledger on the other hand is highly immune to such malicious exploitations and attacks since by the nature of its architecture the blocks arranged in the blockchain are immutable and irreversible. It is therefore impossible to alter the information recorded in the distributed ledger. Even if such theoretic possibility did exist through comprising of a sufficient number of nodes of the blockchain community, such a possibility may be impossible with the vehicle community which may include an immense number of vehicles collectively maintaining the distribute ledger.

In addition, scalability of the centralized authentication entities may be highly limited. The ever increasing number of vehicles may impose major limitations on the ability of the centralized authentication entities to effectively provide the authentication service for such a large number of vehicles at a reasonable cost. The distributed ledger however may be highly scalable since it is controlled and maintained in a distributed manner by a huge and constantly growing number of relatively small and low cost computing devices deployed in the vehicles themselves thus making the distributed ledger based vehicle authentication highly scalable.

Also, the distributed ledger based vehicle authentication may be significantly more robust than the centralized authentication entities as the distributed ledger eliminates any single pint of failure which may be inherent in the centralized authentication entities. Any failure to communicate, interact and/or access the centralized authentication entity may lead to complete loss of the authentication service until the centralized authentication entity is restored. The distributed ledger based vehicle authentication however may be fully operational even when some of the vehicles of the community are not available (off line) since at any given time at any given location there may exist a plurality of other vehicles which are capable to provide the authentication service.

Before explaining at least one embodiment in detail, it is to be understood that the embodiments are not necessarily limited in their application to the details of construction and the arrangement of the components and/or methods set forth in the following description and/or illustrated in the drawings and/or the Examples. The embodiments described herein are capable of other embodiments or of being practiced or carried out in various ways.

The embodiment described herein may include a system, a method, and/or a computer program product. The computer program product may include a computer readable storage medium (or media) having computer readable program instructions thereon for causing a processor to carry out aspects of the embodiment described herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiment described herein may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiment described herein.

Aspects of the embodiment described herein are described with reference to flowchart illustrations and/or block diagrams of methods, apparatus (systems), and computer program products according to embodiments described herein. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of described herein. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart of an exemplary process of authenticating a vehicle based on trust established in a community of networked vehicles according to a consensus among the vehicles, according to some embodiments described herein.

An exemplary process 100 may be executed by one or more parties, for example, a vehicle of a community of vehicles comprising a plurality of networked vehicles, a service system configured to provide a service and/or the like for authenticating one or more other vehicles requesting to establish a communication session with the respective party. The authentication is based on trust established within the community of vehicles, in particular based on a distributed ledger, for example, a blockchain and/or the like maintained by the plurality of vehicles according to a consensus among the vehicles.

Figure 2B:
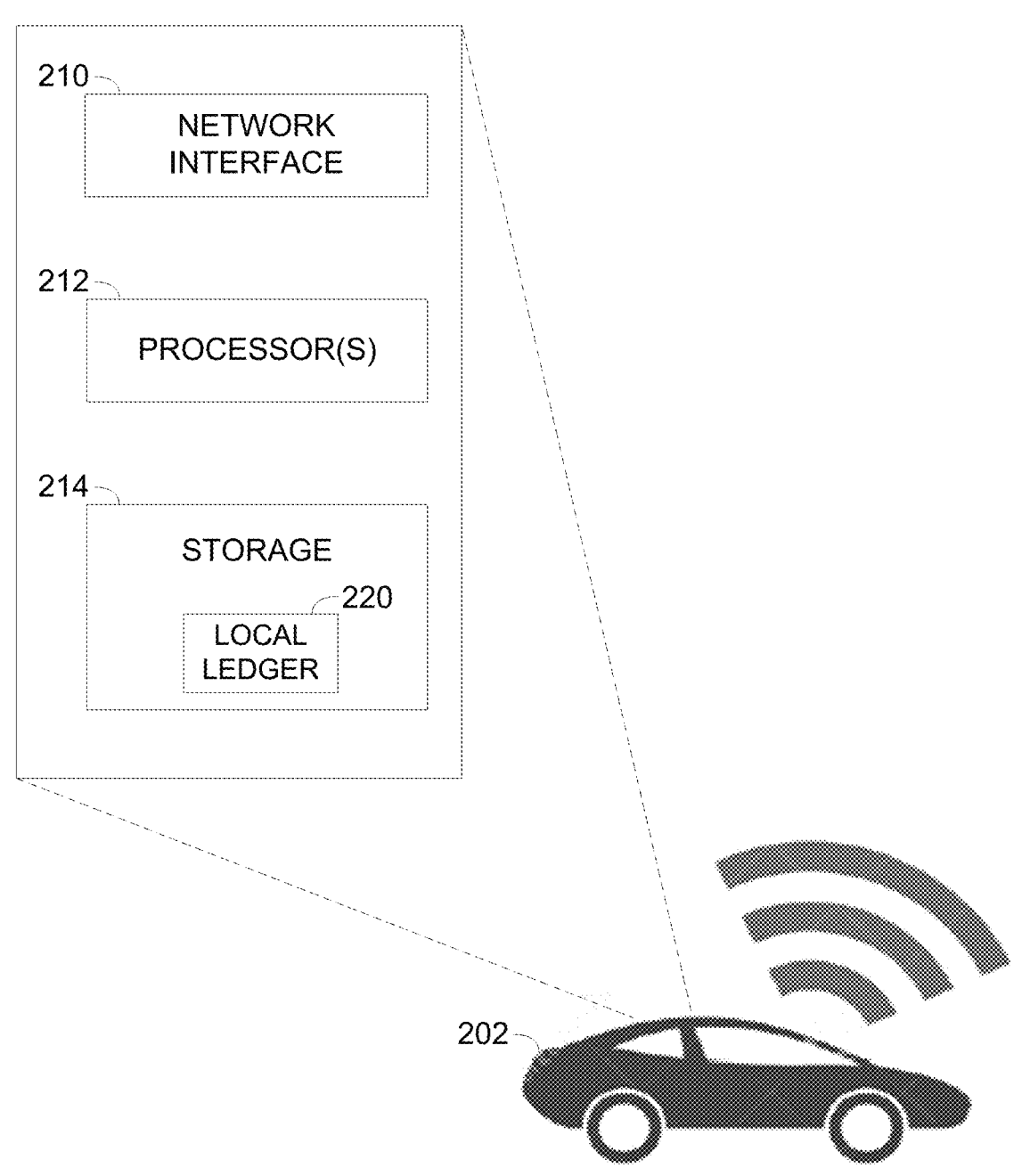

Reference is also made to FIG. 2A and FIG. 2B, which are schematic illustrations of an exemplary vehicle community environment for authenticating a vehicle based on trust established in a community of networked vehicles according to a consensus among the vehicles, according to some embodiments described herein.

As shown at FIG. 2A, an exemplary vehicle community environment 200 may include a plurality of vehicles 202, in particular networked vehicles 202 capable of communicating with each other and optionally with one or more systems, platforms, services and/or infrastructures 204 via one or more communication channels which may be wired and/or wireless. Specifically, the communication channels may include one or more Vehicle to Anything (V2X) communication channels for example, Vehicle to Infrastructure (V2I), Vehicle to Network (V2N), Vehicle to Vehicle (V2V), Vehicle to Device (V2D), Vehicle to Grid (V2G) and/or the like.

The networked vehicles 202 may include, for example, cars, motorcycles, bicycles, trucks, buses, trains, trams and/ or the like.

The systems, platforms, services and/or infrastructures 204 (collectively designated service system 204 herein after) may be configured to provide one or more services to one or more of the vehicles 202. For example, one or more of the service systems 204 may be configured to provide network connectivity services, for example, cellular network access and/or service to one or more of the vehicles 202. In another example, one or more of the service systems 204 may be an Advanced Driver Assistance System configured to provide driver assistance services to one or more of the vehicles 202. In another example, one or more of the service systems 204 may be configured to provide multimedia services, for example, video, audio and/or data streaming services to one or more of the vehicles 202. In another example, one or more of the service systems 204 may be configured to provide navigation and/or maps services to one or more of the vehicles 202. In another example, one or more of the service systems 204 may be configured to provide software update services to one or more of the vehicles 202. In another example, one or more of the service systems 204 may be configured to provide fueling and/or (electric) charging services to one or more of the vehicles 202. In another example, one or more of the service systems 204 may be configured to provide auto repair services to one or more of the vehicles 202.

The service systems 204 may further include one or more transportation infrastructure systems, for example, a smart traffic light, a transportation monitor and/or control system, a smart city infrastructure and/or the like with which one or more of the vehicles 202 may communicate to receive one or more services and/or to report one or more data items. For example, a certain vehicle 202 arriving to an intersection may communicate with one or more smart traffic lights and/or a traffic control system which may control one or more of the traffic lights in the intersection accordingly. In another example, one or more vehicles 202 may communicate and report its location and optionally additional data (e.g. ID, travel route, etc.) to one or more smart city and/or traffic monitor and control systems which monitor traffic volume for one or more purposes.

Since the vehicles 202 may be dynamic and mobile (moving), the communication channels used by the vehicles, in particular, the V2X communication channels may typically include one or more wireless communication channels such as, for example, Wireless Local Area Network (WLAN, e.g. Wi-Fi), Dedicated Short-Range Communication (DSRC), 5G (5$^{th}$ generation) cellular network, direct Device-to-Device (D2D) side link and/or the like.

Moreover, due to the mobile and dynamic nature of the vehicles 202, the networks established to connect the vehicles 202 or more specifically subsets of the vehicles 202 may be Ad-Hoc networks which may not be fully connected at all times and may rapidly change its structure and layout. Therefore, one or more local Ad-Hoc networks, connections and/or sessions (designated Ad-Hoc networks herein after) may be established between two or more nearby vehicles

202 of the community which are within the reception range of the communication channel(s) in use.

However, the communication channels may further include one or more wired communication channels established over one or more infrastructure networks, for example, a Local Area Network (LAN), a Controller Area Network (CAN) bus, a serial channel, a Universal Serial Bus (USB) and/or the like. Such wired communication channels may be used by one or more of the vehicles 202 when stationary and not moving, for example, parked, served (e.g. fueled, charged, washed, etc.). Using the wired communication channels, one or more of the vehicles 202 may communicate with one or more other of the other vehicles 202 and/or with one or more of the service systems 204. For example, multiple vehicles 202 parked in a parking lot may communicate with each other via one or more infrastructure networks, for example, LAN to which each of vehicles 202 may connect via some communication poles distributed next to their parking spaces. In another example, one or more vehicles 202 connecting to a service system 204, for example, an electric charging station may communicate with the charging station via one or more infrastructure networks, for example, CAN bus.

The communication session established between one or more of the vehicles 202 and/or between the one or more of the vehicles 202 and one or more of the service systems 204 may require authentication of the respective vehicles 202 to verify their genuine identity. Authenticating vehicles 202 may be done for one or more objectives, purposes and/or applications, for example, to prevent potentially malicious parties from imitating as one or more of the legitimate vehicles 202 in attempt to deceive one or more of the other vehicles 202 and/or one or more of the service systems 204. Such malicious deception may be done, for example, by a malicious vehicle in attempt to receive a service on behalf of a legitimate vehicle 202. Such malicious deception may be done, for example, by a malicious vehicle in attempt to receive a service on behalf of a legitimate vehicle 202. In another example, a malicious deception may be done, for example, in attempt to deliver malicious software to one or more of the vehicles 202.

Therefore, when one or more of the vehicles 202 and/or one or more of the service systems 204 is requested to establish a communication session with a vehicle 202, the requested vehicle(s) 202 and/or the requested service system(s) 204 may execute the process 100 to first authenticate the requesting vehicle 202 before establishing the communication session. For example, a first vehicle 202, for example, vehicle 202A may request to establish a communication session with one or more of the second vehicles 202, for example, second vehicle 202B and/or with one or more of the service systems 204, for example, a service system 204A. In such case the second vehicle 202B and/or the service system 204A may execute the process 100 to authenticate the requesting vehicle 202A.

As shown at FIG. 2B, each vehicle 202 of the community may include a network interface 210, a processor(s) 212, storage 214 and an Input/Output (I/O) interface 216.

The network interface 210 may include one or more wireless and optionally wired interfaces for communicating via one or more of the communication channels, for example, with one or more other vehicles 202 and/or with one or more of the service systems 204. To this end, the network interface 210 may include one or more wireless communication interfaces, for example, a WLAN interface (e.g. Wi-Fi), a DSRC interfaces, a 5G cellular interface, a D2D side link interface and/or the like. The network interface 210 may further include one or more wired communication interfaces, for example, a LAN interface, a serial interface, a USB interface, a CAN bus interface and/or the like.

The processor(s) 212, homogenous or heterogeneous, may include one or more processors arranged for parallel processing, as clusters and/or as one or more multi core processor(s). The storage 214 used for storing program code (program store) and/or data may include one or more non-transitory persistent storage devices, for example, a Read Only Memory (ROM) component, a hard drive, a Flash array and/or the like. The storage 212 may further include one or more volatile devices, for example, a Random Access Memory (RAM) component, a cache memory and/or the like.

The processor(s) 212 may execute one or more software modules such as, for example, a process, a script, an application, an agent, a utility, a tool, an Operating System (OS) and/or the like each comprising a plurality of program instructions stored in a non-transitory medium (program store) such as the storage 214 and executed by one or more processors such as the processor(s) 212. The processor(s) 212 may be further coupled and/or supported by the one or more hardware elements (modules) available in the vehicle 202, for example, a circuit, a component, an Integrated Circuit (IC), an Application Specific Integrated Circuit (ASIC), a Field Programmable Gate Array (FPGA), a Digital Signals Processor (DSP), a communication processor and/or the like.

One or more of the vehicles 202 may therefore execute one or more functional modules, implemented by one or more software modules, one or more of the hardware modules and/or a combination thereof to execute the process 100 for authenticating one or more other vehicles 202 before establishing a communication session with the other vehicle(s) 202.

Similarly, each of the service system(s) 204 may include networking, computing and storage resources such as the network interface 210, the processor(s) 212 and the storage 214 respectively. One or more of the service system(s) 204 may therefore execute one or more functional modules, implemented by one or more software modules, one or more hardware modules and/or a combination thereof to execute the process 100 for authenticating one or more of the vehicles 202 before establishing a communication session with the vehicle(s) 202 to provide it one or more services.

Authentication of the vehicles 202, for example, the vehicle 202A is done based on a unique identifier (ID), for example, a Vehicle Identification Number (VIN) assigned to each of the plurality of vehicles 202 and a public key of the respective vehicle 202. Each of the plurality of vehicles 202 is assigned with a unique cryptographic key pair, specifically an asymmetric cryptographic key pair comprising a respective private key and a respective public key derived from the respective private key. The public key of each of the vehicles 202 is publicly distributed while the private key of each vehicle 202 is privately stored by the respective vehicle 202 and is thus known only to the respective vehicle 202. As known in the art, a message signed (encrypted) using a certain private key may be decoded (decrypted) using the respective public key derived from the certain private key. Therefore, a message originating from a certain vehicle 202 and signed using the private key assigned to the certain vehicle 202 may be decoded using the public key associated with the certain vehicle 202 thus ensuring that the certain vehicle is the origin of the message.

The community of the plurality of vehicles 202 may maintain a distributed ledger 206 which lists the plurality vehicles 202 associated with their respective public key. In particular, each of the plurality of vehicles 202 may store a local copy of the distributed ledger 206 and maintain, i.e. update their locally stored ledger based on a consensus among at least some of the vehicles 202.

The distributed ledger 206, for example, a blockchain and/or the like may be constructed of a plurality of immutable irreversible blocks as known in the art. The immutable and irreversible blocks are created by a single authorized management system 208 to record the association between the vehicles and their public keys. For example, each block of the distributed ledger may be created by the authorized management system 208 for a respective one of the plurality of vehicles 202 and may thus associate the identifier of the respective vehicle 202 with the public key of the respective vehicle 202.

The authorized management system 208 may be utilized by one or more commercial, public and/or state entities. For example, the authorized management system 208 may be a manufacturer (OEM) of the vehicles 202, an integrator of the vehicles 202 and/or the like. In another example, the authorized management system 208 may be a joint consortium established multiple car manufacturers to manage and log vehicles 202 manufactured by the multiple car makers. In another example, the authorized management system 208 may be a state regulative authority. The authorized management system 208 may transmit the each of the immutable irreversible blocks to at least some of the vehicles 202 of the community which may propagate the blocks to other vehicles 202 until each block is distributed to all of the vehicles 202 which may update their locally stored copy of the distributed ledger 206 accordingly.

Optionally, one or more of the blocks further associates one or more respective vehicle 202 with one or more vehicle properties identified by the authorized management system 208 for the respective vehicle 202. The vehicle properties may include, for example, a model, a manufacturer, a year of manufacture, a color, a chassis serial number, an engine serial number and/or the like.

Reference is now made to FIG. 3, which is a schematic illustration of an exemplary blockchain distributed ledger maintained by a community of networked vehicles for authenticating a vehicle according to a consensus among the vehicles, according to some embodiments described herein.

An exemplary distributed ledger such as the distributed ledger 206, for example, a blockchain may include a plurality of immutable irreversible blocks 302 created by an authorized management system such as the authorized management system 208. Specifically, authorized management system 208 may create each of the blocks 302 appended to the distributed ledger 206 for a respective one of a plurality of vehicles such as the vehicle 202, for example, a block 302-1 may be created for a first vehicle 202, a block 302-2 may be created for a second vehicle 202 and so on to a block 302-N created for a $N^{th}$ vehicle 202. After created, the distributed ledger 206 may be maintained by a community comprising the plurality of vehicles 202 and/or part thereof.

Each block 302 may include at least an ID (e.g. the VIN) of its respective vehicle 302 and the public key associated with the respective vehicle 302 as defined by the authorized management system 208. Optionally, one or more of the blocks 302 may further list one or more vehicle properties identified by the authorized management system 208 for the respective vehicle 202. Such properties may include, for example, a model, a manufacturer, a year of manufacture, a color, a chassis serial number, an engine serial number and/or the like.

Reference is made once again the FIG. 1 and FIG. 2.

Each of the plurality of vehicles 202 may communicate with other vehicles 202 of the plurality of vehicles 202 of the community to continuously update and synchronize its respective locally stored copy of the distributed ledger 206. Specifically, the vehicles 202 communicating with each other may employ one or more consensus algorithms and/or consensus protocols as known in the art for maintaining, synchronizing and updating their local ledger copies in order to ensure integrity, reliability and/or immunity to malicious attacks initiated in attempt to compromise the distributed ledger 206.

However, due to one or more conditions, typically it may impossible for each vehicle 202 to communicate with all of the other vehicles 202. For example, some of the vehicles 202 may be out of communication range from other vehicles 2020. In another example, one or more of the vehicles 202 may be inactive and/or offline thus unable to communicate with other vehicles 202. Therefore, each of the vehicles 202 may communicate with only a subset of other vehicles 202 to update and synchronize its respective locally stored copy of the distributed ledger 206. The number of vehicles 202 of the subset that is sufficient to reach a reliable consensus upon which the respective vehicle 202 may update its locally stored copy of the distributed ledger 206 may be defined and set according to one or more parameters of the consensus algorithm(s) employed by the plurality of vehicles 202 for updating and synchronizing their respective locally stored copies of the distributed ledger 206. For example, a first consensus algorithm may define that five vehicles 202 are sufficient for engaging in consensus session to update their respective locally stored copies of the distributed ledger 206. In another example, a first consensus algorithm may define that eleven vehicles 202 are sufficient for engaging in consensus session to update their respective locally stored copies of the distributed ledger 206.

Naturally, each of the vehicles 202 may communicate with a respective subset of other vehicles 202 which are within a reception range of the communication channel(s) used by the respective vehicle 202 to enable the respective vehicle to communicate with each vehicle of the subset.

Optionally, one or more of the vehicles 202 may communicate with one or more of the other vehicles 202 of the respective subset each in a plurality of separate communication sessions while the respective vehicle 202 of the respective subset is located within the reception range. For example, assuming a first vehicle 202 is located within the reception range of a second vehicle during a first time period, in the reception range of a third and a fourth vehicles during a second time period and in the reception range of a fifth vehicle during a third time. Further assuming the consensus algorithm employed by the vehicles 202 defines that four vehicles 202 are sufficient for establishing the consensus. In such case, the first vehicle 202 may communicate with the subset of vehicles 202 comprising the second, third, fourth and fifth vehicles 202 in a plurality of separate communication sessions to update its locally stored copy of the distributed ledger 206, i.e., the copy locally stored by the first vehicle 202.

Optionally, one or more of the vehicles 202 may communicate with one or more of the other vehicles 202 of the respective subset to cumulatively (i.e., gradually) update its locally stored ledger in a plurality of separate communication sessions where in each of the communication sessions the respective vehicle 202 receives a respective portion of update data for updating its locally stored ledger. For example, assuming a first vehicle 202 is located within the reception range of a second, a third, a fourth, a firth and a sixth vehicles 202 during a first, a second, a third and a fourth time periods starting at, for example, 10:45, 13:00, 15:15 and 20:30 respectively. Further assuming the consensus algorithm employed by the vehicles 202 defines that five vehicles 202 are sufficient for establishing the consensus. In such case, the first vehicle 202 may communicate with the subset of vehicles 202 comprising the second, third, fourth, fifth and sixth vehicles 202 during the first time period to receive a first portion of update data, during the second time period to receive a second portion of update data, during the third time period to receive a third portion of update data and during the fourth time period to receive a fourth portion of update data. After accumulating the four portions of update data, the first vehicle 202 may use the cumulative update data to update accordingly its locally stored copy of the distributed ledger 206.

In order to communicate with other vehicles 202, with one or more of the service systems 204 and optionally with the authorized management system 208 to continuously update, propagate and/or distribute the local copy of the distributed ledger 206, each of the vehicles 202 may execute one or more software modules which may optionally utilize one or more of the hardware modules as described herein before.

As described herein before, the process 100 may be executed by one or more of the vehicles 202 for authenticating one or more other vehicles 202 requesting to establish a communication session with them. the process 100 may be also executed by one or more of the service systems 204 for authenticating one or more of the vehicles 202 requesting one or more services from the respective service system 204.

For brevity the process 100 is described for authenticating a single vehicle 202, for example, the vehicle 202A by another vehicle, for example, the vehicle 202B before establishing a communication session with the vehicle 202A. This however, should not be construed as limiting since the same process 100 may be repeated by the vehicle 202B for authenticating multiple vehicles 202 requesting to establish communication sessions with the vehicle 202B. Moreover, the process 100 may be executed by one or more of the service systems 204 to authenticate one or more of the vehicles 202 requesting service from the respective service system 204.

As shown at 102, one or more of the vehicles 202, for example, the vehicle 202B may receive a request from one or more other vehicles 202, for example, the vehicle 202A to establish a communication session via one or more communication channels established between the vehicle 202A and the vehicle 202B.

As shown at 104, the vehicle 202B may transmit, via the communication channel(s), an identification request to the vehicle 202A in order to authenticate the vehicle 202 and verify its genuine identity before establishing the communication session.

Authenticating the vehicle 202A may significantly reduce exposure of the vehicle 202B to malicious exploitation and/or attack which may be initiated by one or more malicious parties impersonating as a genuine vehicle, for example, the vehicle 202A in attempt to compromise the vehicle 202B.

As shown at 106, in response to the identification request, the vehicle 202A may transmit back to the vehicle 202B, via the communication channel(s), the identifier (ID) of the vehicle 202A, for example, the VIN and a message signed (encrypted) using the private key of the vehicle 202A.

The content of the message may be defined and/or set according to one or more rules of one or more communication protocols employed by the vehicles 202 to communicate with each other. For example, the message may include one or more predefined values indicative of correct decoding (deciphering) of the signed message.

Optionally, the message may further include one or more of the properties of the vehicle 202A listed in the distributed ledger 206, for example, the model, the color and/or the like.

The message may be signed as one or more hash values computed using one or more hash functions based on the private key of the vehicle 202A as known in the art. For example, the message may include multiple properties of the vehicle 202A each hashed in a respective hash value computed using the hash function(s) based on the private key of the vehicle 202A. In another example, the message may include a single hash value computed using the hash function(s) based on the private key of the vehicle 202A to hash a plurality of properties of the vehicle 202A concatenated into a single string.

Optionally, the vehicle 202A may transmit the identifier and the signed message as part of the initial request transmitted to the vehicle 202B to establish the communication session with the vehicle 202B. In such case the steps 104 and 106 may be redundant and hence avoided.

As shown at 108, the vehicle 202B may transmit an authentication request to a trusted vehicle of the plurality of vehicles 202 via one or more communication channels established between the vehicle 202B and the trusted vehicle 202.

The trusted vehicle 202 may be, for example, a vehicle with which the vehicle 202B has already communicated in the past and is thus trusted by the vehicle 202B. In another example, the trusted vehicle 202 may be a vehicle which is listed by the vehicle 202B as trusted following some trust transfer process, procedure and/or the like. For example, the vehicle 202B may authenticate the trusted vehicle 202 to be genuine based on a consensus session conducted by the vehicle 202B with at least some of the plurality of vehicles 202.

The authentication request transmitted by the vehicle 202B to the trusted vehicle 202 may comprise the identifier and the signed message received from the vehicle 202A.

After receiving the authentication request, the trusted vehicle 202 may extract the identifier of the vehicle 202A and the signed message initially received from the vehicle 202A. The trusted vehicle 202 may then traverse its locally stored ledger, using the identifier of the vehicle 202A, to retrieve the public key associated in the distributed ledger 206 with the vehicle 202A.

The trusted vehicle 202 may then use the retrieved public key to decode (decipher) the signed message. In case the retrieved public key is indeed a derivation of the private key used by the vehicle 202A to sign the message, the trusted vehicle 202 may successfully decode the signed message and extract its content which may indicate of the correct decoding and may further include one or more properties of the vehicle 202A. The trusted vehicle 202 may therefore successfully verify that the vehicle 202A is genuinely associated with the retrieved public key and the vehicle 202A is therefore successfully authenticated.

However, in case the trusted vehicle 202 is unable to successfully decode the message using the retrieved public key, the trusted vehicle 202 may determine that the retrieved public key is not derived from the private key used by the vehicle 202A and may thus fail to verify the association of the public key with the vehicle 202A. This may indicate that the vehicle 202A is not genuinely associated with the retrieved public key but may be rather attempting to impersonate as the genuine vehicle 202A. The trusted vehicle 202 may therefore determine that the authentication of the vehicle 202A failed.

As shown at 110, the trusted vehicle 202 may transmit a response back to the vehicle 202B indicative of success or failure of the verification of the public key associated with the vehicle 202A. In other words, the response received by the vehicle 202B from the trusted vehicle 202 indicates whether the trusted vehicle succeeded or failed to authenticate the vehicle 202A based on the public key associated in the distributed ledger 206 with the vehicle 202A.

As shown at 112, which is a conditional step, in case of successful verification, the process branches to 114. However, in case of verification failure, the process branches to 116.

As shown at 114, since the vehicle 202A is successfully authenticated, the vehicle 202B may accept the request of the vehicle 202A and may establish the communication session with the vehicle 202A.

As shown at 116, as the vehicle 202A failed to be properly authenticated, the vehicle 202B may refuse to establish the communication session with the vehicle 202A.

According to some embodiments, instead of communicating with the trusteed vehicle 202, the vehicle 202B may retrieve the public key of the vehicle 202A from a locally stored copy of the distributed ledger 206 stored at the vehicle 202B. This operation mode is applicable and possible in case the vehicle 202B maintains a synchronized and updated local copy of the distributed ledger 206.

In such embodiments, the vehicle 202B may extract the identifier of the vehicle 202A and the signed message received from the vehicle 202A and may traverse its locally stored ledger, using the identifier of the vehicle 202A, to retrieve the public key associated in the distributed ledger 206 with the vehicle 202A. The vehicle 202B may then use the retrieved public key to decode the signed message and verify whether it is genuinely associated with the vehicle 202A based on successful decoding of the message using the retrieved public key indicating that the retrieved public key is indeed derived from the private key used by the vehicle 202A to sign the message.

Alternatively, according to some embodiments, the vehicle 202A and/or the service system 204 may verify that the identifier provided by the first vehicle 202A is genuinely associated in the distributed ledger 206 with the public key of the vehicle 202A based on a consensus among at least a subset of the plurality of vehicles 202 each using its locally stored copy of the distributed ledger 206 to decode the message using the public key associated with the vehicle 202A. This This operation mode is applicable and possible in case the vehicle 202B identifies at least a subset of the plurality of vehicles 202 which are in close proximity to the vehicle 202B, specifically in the transmission and reception range of the vehicle 202B and of each other.

Reference is now mad to FIG. 4, which is a flowchart of an exemplary alternative process of authenticating a vehicle based on trust established in a community of networked vehicles according to a consensus among the vehicles, according to some embodiments described herein.

In response to a request to establish a communication session received with a first vehicle such as the vehicle 202A, a second vehicle such as the vehicle 202B and/or a service system such as the service system 204 may initiate an exemplary process 400 to authenticate the e vehicle 202A prior to establishing the communication session, as stated for the process 100, the process 400 is also presented for authenticating a single vehicle 202A. This however should not be construed as limiting since the process 400 may be expanded to authenticate a plurality of vehicles requesting to establish a communication session with the vehicle 202B. Furthermore, the process 400 may be executed by one or more service systems such as the service systems 204 to authenticate one or more of the vehicles 202 requesting one or more services from the service system(s) 204.

Steps 402, 404, 406, 410, 412, 414 and 416 of the process 400 are identical to steps 102, 104, 106, 110, 112, 114 and 116 of the process 100 respectively. The only difference in the process 400 compared to the process 100 is the step 408.

As shown at 408, the vehicle 202B may transmit the identifier of the vehicle 202A and the message signed by the vehicle 202 using its private key to an in-range subset of vehicles 202. The subset of vehicles 202 may then engage in a consensus session according to one or more of the consensus algorithms and/or protocols to reach a consensus of whether the identifier provided by the vehicle 202 is genuinely associated with the public key associated with the vehicle 202A in the distributed ledger 206. For example, each of the vehicles 202 of the subset may retrieve the public key associated with the identifier of the vehicle 202A from its respective locally stored copy of the distributed ledger 206. Each of the vehicles 202 of the subset may then use its respective retrieved public key to decode the signed message and may verify whether the public key is indeed derived from the private key used to sign the message or not. The subset of vehicles 202 may then engage in the consensus session to collectively verify, based on their individual determination, whether the identifier is genuinely associated with the respective public key. Based on the collective determination, the vehicles 202 of the subset may successfully authenticate the vehicle 202A (in case of successful verification) or fail to authenticate the vehicle 202 (in case of failed verification).

Since the number of vehicles 202 of the subset that may be in range of the vehicle 202B may be limited, the number of vehicles 202 in the subset may be defined according to one or more rules and/or guidelines. For example, as described herein before, the number of vehicles 202 of the subset may be defined by one or more parameters of the consensus algorithm(s) used by the subset of vehicles 202 to verify the association of the identifier with the public key. In another example, the number of vehicles 202 of the subset may be defined by one or more security parameters defined for the communication session requested by the vehicle 202A. For example, assuming the vehicle 202A requests to establish the communication session with the vehicle 202B for the purpose of exchanging low sensitivity data such as, for example, operational status information. In such case, the vehicle 202A may be authenticated with relatively lower certainty and/or reliability and therefore the vehicle 202B may initiate the consensus session with a subset comprising a relatively low number of vehicles 202, for example, three vehicles 202. However, assuming the vehicle 202A requests to establish the communication session with the vehicle 202B for the purpose of exchanging highly sensitivity and/or mission critical data such as, for example, a software update, a geolocation, an operative command and/or the like. In such case, the vehicle 202A must be authenticated with significantly high certainty and/or reliability and therefore the vehicle 202B may initiate the consensus session with a subset comprising a high number of vehicles 202, for example, twelve vehicles 202.

The subset of vehicles 202 may then respond to the vehicle 202B with a response indicative of success or failure to verify association of the identifier with the public key, or in other words, success or failure to authenticate the vehicle 202A.

As described in the process 100, based on the response received from the subset of vehicles 202, the vehicle 202B may establish the communication session with the vehicle 202A or refuse to engage in such a communication session.

The descriptions of the various embodiments described herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms distributed ledger, blockchain, consensus algorithms and V2X communication are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments described herein may be presented in a range format. It should be understood that the description in range format is merely for convenience and brevity and should not be construed as an inflexible limitation on the scope of the embodiments described herein. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment described herein may include a plurality of "optional" features unless such features conflict.

It is appreciated that certain features of the embodiments described herein, which are, for clarity, described in the context of separate embodiments, may also be provided in combination in a single embodiment. Conversely, various features of the embodiments described herein, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although the embodiments described herein have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the embodiments described herein. To the extent that section headings are used, they should not be construed as necessarily limiting. In addition, any priority document(s) of this application is/are hereby incorporated herein by reference in its/their entirety.

What is claimed is:

1. A method of authenticating vehicles based on trust established within a community of vehicles using a distributed ledger, comprising:

using at least one processor of a trusted party for:

receiving from at least one vehicle of a plurality of vehicles, via at least one communication channel, an authentication request comprising an identifier of at least one another vehicle and a message signed using a private key of the at least one another vehicle, the message is decodable using a public key derived from the private key;

verifying the identifier is genuinely associated with the public key of the at least one another vehicle by decoding the message using the public key retrieved from a local ledger stored by the trusted vehicle party, the local ledger is a copy of a distributed ledger associating an identifier of each of the plurality of vehicles with a respective unique public key; and transmitting to the at least one vehicle a response indicative of a verification success or failure;

wherein the at least one vehicle establishes a communication session with the at least one another vehicle in case of successful verification;

wherein the trusted party which comprises a trusted vehicle and/or a trusted service system is characterized by being trusted by the at least one vehicle based on at least one past communications session between the at least one vehicle and the trusted party.

2. The method of claim 1, wherein the message is signed as at least one hash value computed using at least one hash function based on the private key of the at least one vehicle.

3. The method of claim 1, further comprising verifying the identifier is genuinely associated with the public key by decoding the message using the public key retrieved from a locally stored ledger which is a copy of the distributed ledger.

4. The method of claim 1, further comprising verifying the identifier is genuinely associated with the public key based on a consensus among a subset of the plurality of vehicles each using its locally stored ledger to decode the message using the public key.

5. The method of claim 1, wherein the at least one communication channel is a member of a group consisting of: a wireless communication channel and a wired communication channel.

6. The method of claim 1, wherein the at least one communication channel is a Vehicle to Everything (V2X) communication channel comprising at least one member of a group consisting of: a Vehicle to Infrastructure (V2I), communication channel, a Vehicle to Network (V2N) communication channel, a Vehicle to Vehicle (V2V) communication channel, a Vehicle to Device (V2D) communication channel and a Vehicle to Grid (V2G) communication channel.

7. The method of claim 1, wherein the identifier of each of the plurality of vehicles comprises at least a Vehicle Identification Number (VIN) of the respective vehicle.

8. The method of claim 1, wherein the message further comprising at least one of a plurality of properties of the at least one vehicle, the plurality of properties comprising: a manufacturer, a year of manufacture, a color, a chassis serial number and an engine serial number.

9. The method of claim 8, wherein the distributed ledger associates each of at least one of the plurality of vehicles with at least one of the plurality of properties applicable for the respective vehicle.

10. The method of claim 1, wherein the private key and the public key assigned to each of the plurality of vehicles constitute a respective cryptographic key pair uniquely allocated to the respective vehicle, the respective public key of each vehicle is publicly distributed and the respective private key is privately stored by the respective vehicle thus known only to the respective vehicle.

11. The method of claim 1, wherein the distributed ledger maintained by the plurality of vehicles is implemented by a blockchain comprising a plurality of immutable irreversible blocks, each of the plurality of immutable irreversible blocks is created by a single authorized management system to associate a respective one of the plurality of vehicle with a respective unique public key.

12. The method of claim 1, wherein each of the plurality of vehicles communicates with at least a subset of the plurality of vehicles to continuously update and synchronize its respective locally stored ledger.

13. The method of claim 12, wherein the number of vehicles of the subset is set according to at least one parameter of the at least one consensus algorithm employed by the plurality of vehicles for updating and synchronizing their respective locally stored ledgers.

14. The method of claim 12, wherein each of the plurality of vehicles communicates with a respective subset of vehicles located within a reception range of the at least one communication channel of the respective vehicle.

15. The method of claim 14, further comprising the respective vehicle communicates with each of at least some of the vehicles of the respective subset in a plurality of separate communication sessions while the respective vehicle of the respective subset is located within the reception range.

16. The method of claim 1, further comprising at least one of the plurality of vehicles updates and synchronizes its locally stored ledger cumulatively in a plurality of separate communication sessions, during each of the plurality of communication sessions a portion of update data is received for updating the locally stored ledger.

17. A system for authenticating vehicles based on trust established within a community of vehicles using a distributed ledger, comprising:

a storage medium storing a local ledger which is a copy of a distributed ledger associating an identifier of each of a plurality of vehicles with a respective unique public key; and at least one processor of a trusted party coupled to the storage medium, the at least one processor executes a code, the code comprising:

code instructions to receive from at least one vehicle of the plurality of vehicles, via at least one communication channel, an authentication request to authenticate at least one another vehicle, the authentication request comprising an identifier of at least one another vehicle and a message signed using a private key of the at least one another vehicle, the message is decodable using a public key derived from the private key;

code instructions to verify the identifier is genuinely associated with the public key of the at least one another vehicle by decoding the message using the public key retrieved from the local ledger; and code instructions to transmit to the at least one vehicle a response indicative of a verification success or failure; and wherein the at least one vehicle establishes a communication session with the at least one another vehicle in case of successful verification;

wherein the trusted party which comprises a trusted vehicle and/or a trusted service system is characterized by being trusted by the at least one vehicle based on at least one past communications session between the at least one vehicle and the trusted party.

18. A computer program product for authenticating vehicles based on trust established within a community of vehicles using a distributed ledger, comprising a non-transitory medium storing thereon computer program instructions which, when executed by at least one hardware processor of a trusted party, cause the at least one hardware processor to:

receive from at least one vehicle of a plurality of vehicles, via at least one communication channel an authentication request comprising an identifier of at least one another vehicle and a message signed using a private key of the at least one another vehicle, the message is decodable using a public key derived from the private key;

verify the identifier is genuinely associated with the public key of the at least one another vehicle by decoding the message using the public key retrieved from a local ledger stored by the trusted party, the local ledger is a copy of a distributed ledger associating an identifier of each of the plurality of vehicles with a respective unique public key; and transmit to the at least one vehicle a response indicative of a verification success or failure;

wherein the at least one vehicle establishes a communication session with the at least one another vehicle in case of successful verification;

wherein the trusted party which comprises a trusted vehicle and/or a trusted service system is characterized by being trusted by the at least one vehicle based on at least one past communications session between the at least one vehicle and the trusted party.

* * * * *